US012572372B2

(12) United States Patent
Garrote et al.

(10) Patent No.: US 12,572,372 B2
(45) Date of Patent: Mar. 10, 2026

(54) SEMANTIC METADATA VALIDATION

(71) Applicant: Salesforce, Inc., San Francisco, CA (US)

(72) Inventors: Antonio Garrote, San Francisco, CA (US); Pedro Colunga, Pilar, AZ (US); Jonathan Stoikovitch, San Francisco, CA (US); Martin Gutierrez, Pilar, AZ (US); Lucas Block, Pilar, AZ (US); Lucas Luppani, Pilar, AZ (US)

(73) Assignee: Salesforce, Inc., San Francisco, CA (US)

( * ) Notice: Subject to any disclaimer, the term of this patent is extended or adjusted under 35 U.S.C. 154(b) by 342 days.

(21) Appl. No.: 17/948,523

(22) Filed: Sep. 20, 2022

(65) Prior Publication Data

US 2023/0088462 A1 Mar. 23, 2023

Related U.S. Application Data

(60) Provisional application No. 63/246,098, filed on Sep. 20, 2021.

(51) Int. Cl.
G06F 11/3604 (2025.01)
G06F 8/41 (2018.01)
(Continued)

(52) U.S. Cl.
CPC .......... G06F 9/44526 (2013.01); G06F 8/427 (2013.01); G06F 9/541 (2013.01);
(Continued)

(58) Field of Classification Search
CPC ............. G06F 11/3608; G06F 11/3692; G06F 9/44526; G06F 16/24573; G06F 16/2458;
(Continued)

(56) References Cited

U.S. PATENT DOCUMENTS 9,313,207 B2 4/2016 Cicchitto
9,753,744 B1 * 9/2017 Wells ........................ G06F 8/30
(Continued)

FOREIGN PATENT DOCUMENTS

EP 3722968 A1 10/2020
WO 2014189552 A1 11/2014
WO 2016048418 A1 3/2016

OTHER PUBLICATIONS

Hamza Ed-douibi et al., "Automatic Generation of Test Cases for REST APIs: A Specification-Based Approach," 2018 [retrieved on Oct. 19, 2024], 2018 IEEE 22nd International Enterprise Distributed Object Computing Conference (EDOC), pp. 181-190, downloaded from <url>:https://ieeexplore.ieee.org. (Year: 2018).*
(Continued)

*Primary Examiner* — S. Sough
*Assistant Examiner* — Stephen D Berman
(74) *Attorney, Agent, or Firm* — Sterne, Kessler, Goldstein & Fox P.L.L.C.

(57) ABSTRACT

Metadata objects describing a resource may be generated by multiple processes in the IT system and be of different metadata formats. These metadata objects may be parsed into a unified semantic graph over which validation rules may be applied. The semantic graph and a validation ruleset comprising one or more validation rules may be input into a validation engine. The validation engine may interpret the validation into logical assertions then apply them over the semantic graph. The validation engine may then generate a validation report indicating whether the graph is conformant. The validation report may include information about any validation failures that may have occurred and may be displayed to a user on a client device via a graphical user interface.

17 Claims, 6 Drawing Sheets

(51) Int. Cl.

| | |
|---|---|
| *G06F 9/445* | (2018.01) |
| *G06F 9/54* | (2006.01) |
| *G06F 11/3668* | (2025.01) |
| *G06F 16/18* | (2019.01) |
| *G06F 16/22* | (2019.01) |
| *G06F 16/23* | (2019.01) |
| *G06F 16/2455* | (2019.01) |
| *G06F 16/2457* | (2019.01) |
| *G06F 16/2458* | (2019.01) |
| *G06F 16/25* | (2019.01) |

(52) U.S. Cl.
CPC .......... *G06F 9/547* (2013.01); *G06F 11/3608* (2013.01); *G06F 11/3692* (2013.01); *G06F 16/1865* (2019.01); *G06F 16/2255* (2019.01); *G06F 16/2365* (2019.01); *G06F 16/24564* (2019.01); *G06F 16/24573* (2019.01); *G06F 16/2458* (2019.01); *G06F 16/2462* (2019.01); *G06F 16/252* (2019.01)

(58) Field of Classification Search
CPC ............ G06F 16/2255; G06F 16/1865; G06F 16/2365; G06F 16/24564; G06F 16/2462; G06F 16/252; G06F 16/427; G06F 16/541; G06F 16/547
See application file for complete search history.

(56) References Cited

U.S. PATENT DOCUMENTS

| | | | | |
|---|---|---|---|---|
| 10,437,712 | B1 * | 10/2019 | Tyler | G06F 11/3684 |
| 10,853,150 | B1 * | 12/2020 | Bahrami | G06N 5/022 |
| 10,983,963 | B1 | 4/2021 | Venkatasubramanian et al. | |
| 11,947,976 | B2 | 4/2024 | Garrote et al. | |
| 2004/0268305 | A1 | 12/2004 | Hogg et al. | |
| 2006/0095276 | A1 | 5/2006 | Axelrod et al. | |
| 2007/0174741 | A1 * | 7/2007 | Vasudevan | G06F 11/0787 |
| | | | | 714/57 |
| 2007/0214144 | A1 | 9/2007 | Lawson et al. | |
| 2008/0028069 | A1 | 1/2008 | Urbanek et al. | |
| 2008/0034425 | A1 | 2/2008 | Overcash et al. | |
| 2009/0217303 | A1 * | 8/2009 | Grechanik | G06F 11/3414 |
| | | | | 719/320 |
| 2010/0318858 | A1 | 12/2010 | Essawi et al. | |
| 2012/0054095 | A1 | 3/2012 | Lesandro et al. | |
| 2013/0166515 | A1 | 6/2013 | Kung et al. | |
| 2013/0298259 | A1 | 11/2013 | Mattsson et al. | |
| 2014/0068639 | A1 * | 3/2014 | Schrock | G06F 9/54 |
| | | | | 719/328 |
| 2015/0089345 | A1 | 3/2015 | Marimuthu et al. | |
| 2016/0026710 | A1 * | 1/2016 | Laredo | G06F 9/541 |
| | | | | 707/794 |
| 2017/0006066 | A1 | 1/2017 | Eckel | |
| 2017/0103472 | A1 | 4/2017 | Shah | |
| 2017/0177882 | A1 | 6/2017 | Allgaier | |
| 2017/0262441 | A1 | 9/2017 | Horowitz et al. | |
| 2017/0286456 | A1 | 10/2017 | Wenzel et al. | |
| 2018/0314622 | A1 * | 11/2018 | Lowe | G06F 11/3616 |
| 2019/0196890 | A1 * | 6/2019 | Bucchi | G06F 16/951 |
| 2019/0197111 | A1 * | 6/2019 | Garrote | G06F 40/30 |
| 2020/0250176 | A1 | 8/2020 | Padmanabhan | |
| 2022/0101153 | A1 | 3/2022 | Hubauer | |
| 2023/0047837 | A1 * | 2/2023 | Chilupuri | G06F 9/547 |
| 2023/0116336 | A1 | 4/2023 | Garrote et al. | |
| 2023/0229704 | A1 * | 7/2023 | Wang | G06V 10/74 |
| | | | | 707/798 |
| 2024/0241818 | A1 * | 7/2024 | Puzhakkal Pulikkal | |
| | | | | G06F 11/3692 |

OTHER PUBLICATIONS

Wikipedia, "Ontology (Computer Science)," 2021 [retrieved Jun. 14, 2025], pp. 1-19, downloaded from <url>:https://web.archive.org/web/20210802023808/https://en.wikipedia.org/wiki/Ontology_(information_science). (Year: 2021).*

Wikipedia, "Workflow," 2021 [retrieved Jun. 14, 2025], pp. 1-10, downloaded from <url>:https://web.archive.org/web/20210830030042/https://en.wikipedia.org/wiki/Workflow. (Year: 2021).*

Daniel Garijo et al., "OBA: An Ontology-Based Framework for Creating REST APIs for Knowledge Graphs," 2020 [retrieved Oct. 15, 2025], Lecture Notes in Computer Science ((LNISA, vol. 12507)), pp. 48-64, downloaded from <url>:https://link.springer.com/chapter/10.1007/978-3-030-62466-8_4. (Year: 2020).*

Srikanth Jonnada et al., "Measure your API Complexity and Reliability," 2019 [retrieved Oct. 15, 2025], 2019 IEEE 17th International Conference on Software Engineering Research, Management and Applications (SERA), pp. 104-109, downloaded from <url>:https://ieeexplore.ieee.org/abstract/document/8886790. (Year: 2019).*

Miklos Kalman et al., "Rule-Based Web Service Validation", 2014 IEEE International Conference on Web Services, Jun. 1, 2014, (pp. 542-549).

\* cited by examiner

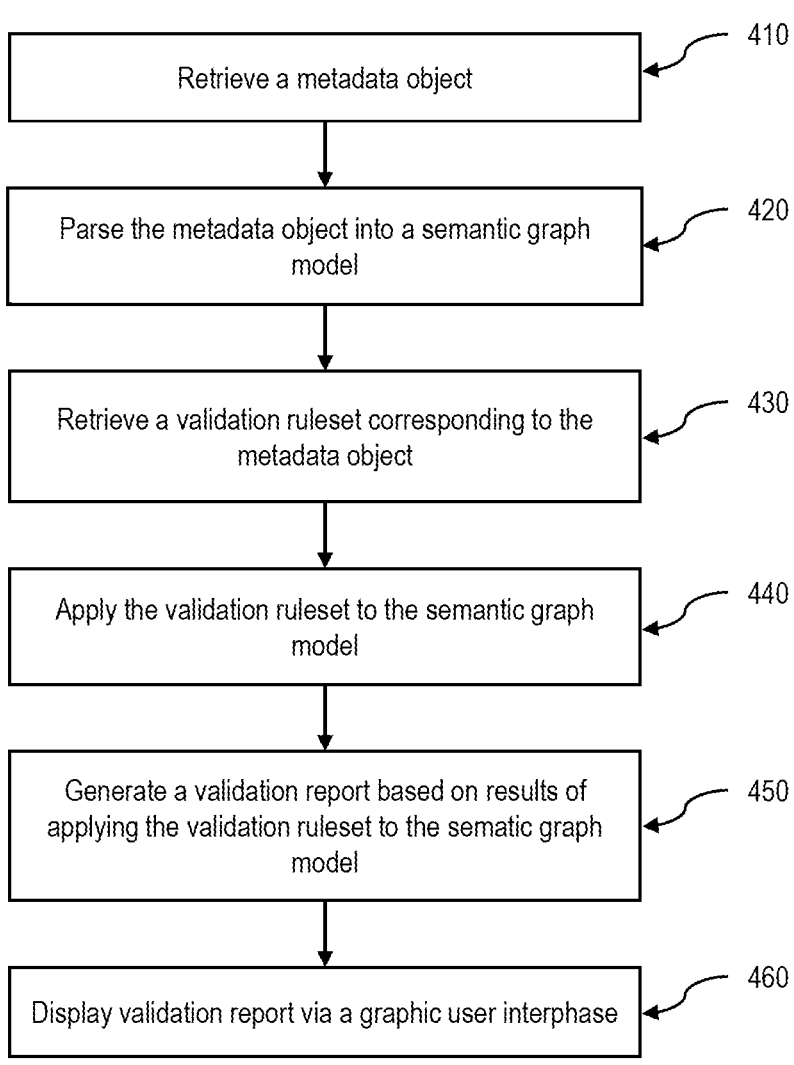

400

Retrieve a metadata object                                      410

Parse the metadata object into a semantic graph model          420

Retrieve a validation ruleset corresponding to the metadata object   430

Apply the validation ruleset to the semantic graph model       440

Generate a validation report based on results of applying the validation ruleset to the sematic graph model   450

Display validation report via a graphic user interphase        460

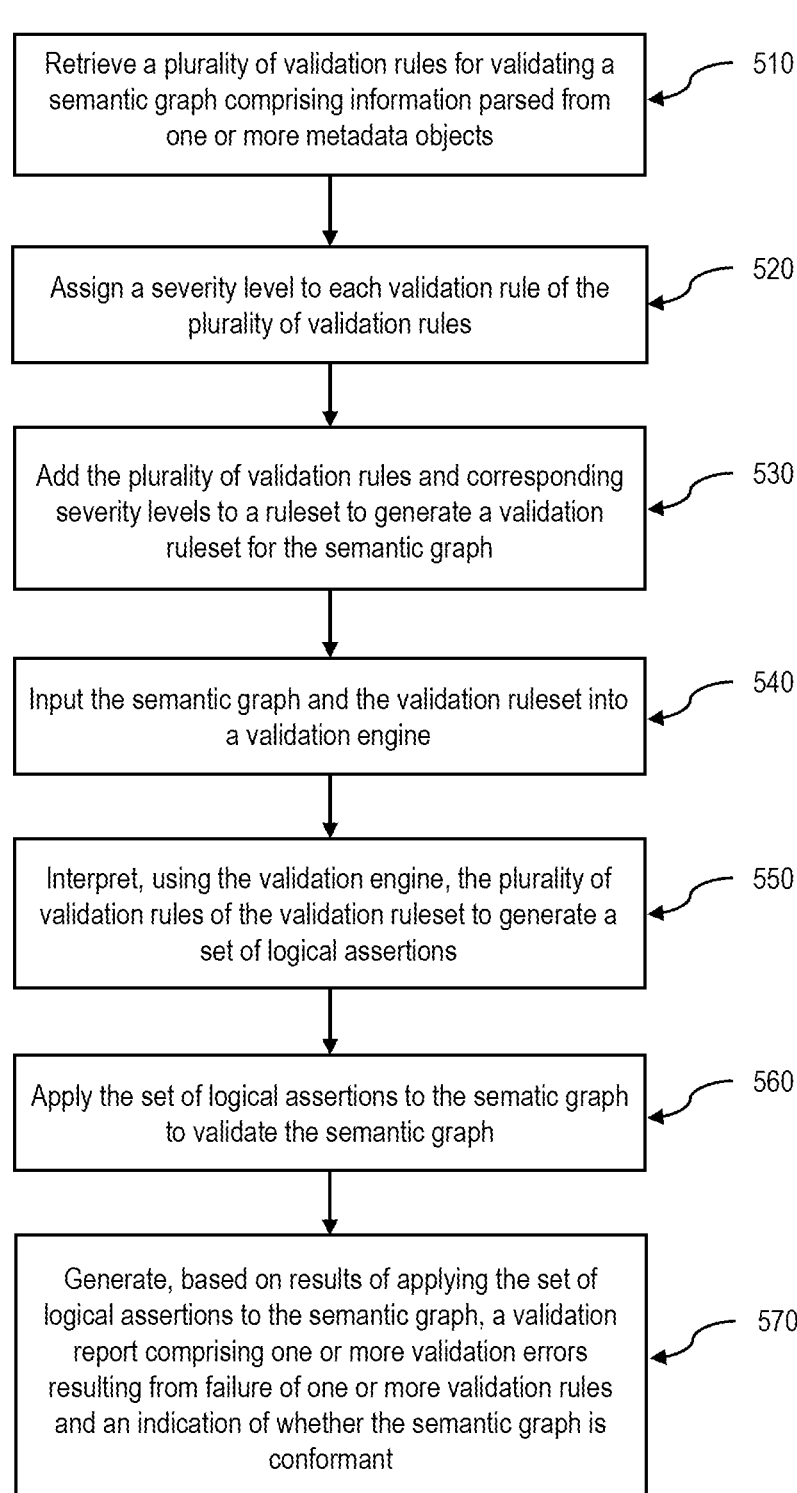

Retrieve a plurality of validation rules for validating a semantic graph comprising information parsed from one or more metadata objects — 510

Assign a severity level to each validation rule of the plurality of validation rules — 520

Add the plurality of validation rules and corresponding severity levels to a ruleset to generate a validation ruleset for the semantic graph — 530

Input the semantic graph and the validation ruleset into a validation engine — 540

Interpret, using the validation engine, the plurality of validation rules of the validation ruleset to generate a set of logical assertions — 550

Apply the set of logical assertions to the semantic graph to validate the semantic graph — 560

Generate, based on results of applying the set of logical assertions to the semantic graph, a validation report comprising one or more validation errors resulting from failure of one or more validation rules and an indication of whether the semantic graph is conformant — 570

FIG. 5

Computer System 600

SEMANTIC METADATA VALIDATION

CROSS-REFERENCE TO RELATED APPLICATIONS

This application claims the benefit of U.S. Provisional Patent Application No. 63/246,098, filed Sep. 20, 2021, entitled "API Governance Using Validation Rulesets," which is incorporated by reference herein in its entirety.

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML) or OpenAPI Specification (OAS).

An endpoint of an API is an access point (e.g., a URL) through which a user can interact with the API (e.g., input and output flows). An API can include one or more endpoints. It is of interest for API developers to make sure APIs behave reliably so as to provide users reliable interaction with the API.

Accordingly, what is needed are tools for validating REST APIs. Existing tools are often syntax specific and may require a different set of validation rules for different types of endpoints. This can be time consuming and tedious for complex APIs.

BRIEF DESCRIPTION OF THE DRAWINGS

The accompanying drawings are incorporated herein and form a part of the specification.

FIG. 4 is a flowchart illustrating an example method for validating metadata using an exemplary semantic schema validation system, in accordance with an embodiment.

FIG. 5 is a flowchart illustrating an example method for generating and utilizing a validation ruleset to validate metadata using an exemplary semantic schema validation system, in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
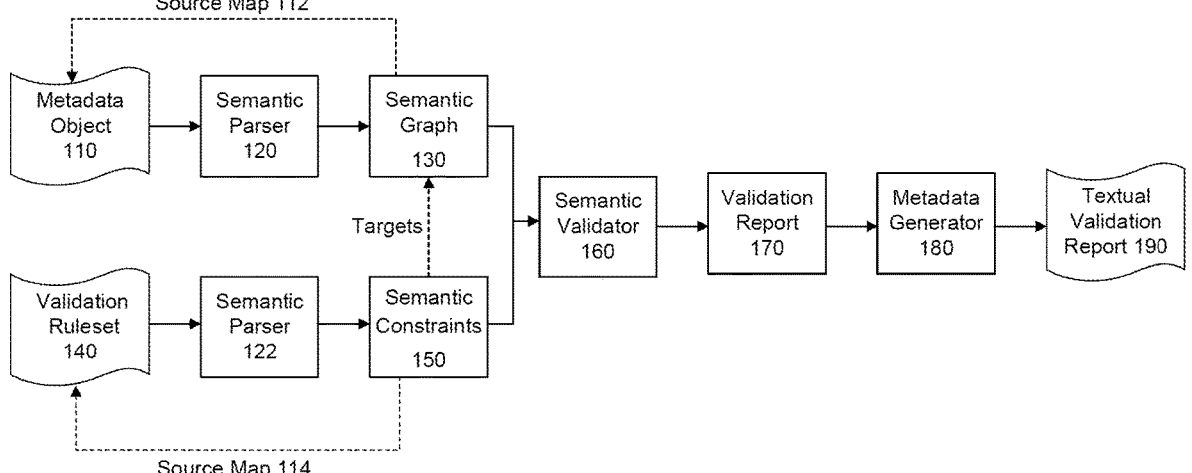
FIG. 1 is a block diagram of a system for semantic metadata validation, in accordance with an embodiment.

Provided herein are system, apparatus, device, method and/or computer program product embodiments, and/or combinations and sub-combinations thereof, for syntax independent validation of metadata.

Within an information technology (IT) system, there may be multiple resources that may generate metadata or from which metadata objects may be generated. A metadata object may describe a resource or specific aspects/functions of a resource and may be stored as structured data in a file system or database. As a non-limiting example, an IT system hosting a REST API may generate metadata describing endpoints of the REST API. In some embodiments, multiple metadata objects describing the same endpoints may be generated. These metadata objects may be of different metadata formats. A metadata format may be a formal mechanism, with a well-defined syntax and grammar, of capturing information consumed or produced by an IT system. Examples of metadata formats may include API specifications (e.g., OAS 3.0, RAIVIL, GraphQL, etc.), configuration files (e.g., Docker files), API policies descriptors (e.g., Kubernetes, Istio CRDs, etc.).

In some embodiments, resources and processes of an IT system may be validated by applying validation rules to the metadata objects describing the resources. This type of validation provides a method for checking that the resource contains all the expected elements and behaves in expected manner. For example, validation of an API may include verifying that each endpoint returns the expected data type, verifying that endpoints containing sensitive information are secure and require authentication to access, etc. This may be accomplished by writing and applying validation rules that enforce the relevant constraints over the metadata object describing the resource.

Validation rules may be declarative functions expressing constraints to be enforced over metadata. A validation rule may comprise three main components. These components may be documentation describing the goal of the rule and the validation error message that will be displayed if the rule fails, a rule target describing a specific part of the metadata to which the validation rule will be applied, and a rule definition. A rule definition may be a declarative expression declaring the constraint that will be checked over the target.

In order to perform resource validation in this way, validation rules need to be written such that they match the metadata format. This can become time-consuming and prone to error when the metadata objects describing the resources are of different metadata formats. This is because different validation rules need to be written for each metadata format even when the metadata objects describe resources that must conform to the same constraints. As such, it would be beneficial to parse the metadata objects into a unified format for which validation rules can be written. This will allow for a syntax independent mechanism to validate heterogeneous metadata generated across a variety of different IT processes.

In some embodiments, the metadata objects may be parsed into a sematic graph data model where the semantic labels of the graph identify information within a particular business domain ontology. Semantic parsers may be used to parse input metadata into a semantic graph and generate global identifiers for each node in the generated semantic graph so related information referenced in different semantic graphs can be linked together into a connected semantic graph that can then be validated. Once input metadata has been parsed and a unified semantic graph has been generated, validation rules may be applied over the semantic graph instead of individual metadata objects. This allows users to define validation rules in a unified and simplified way by targeting a semantic model as opposed to specific syntaxes of different disconnected metadata formats.

In some embodiments, validation rules may be added to a validation ruleset (i.e., a collection of validation rules) that are applied together during the validation process. A validation ruleset may be applied over metadata extracted from multiple resources (i.e. exchange assets, API specs, deployment descriptors) in a platform. These resources can be validated with the ruleset as long as the metadata generated therein is compatible. In some cases, rules are captured as a simple Resource Description Framework (RDF) based on Shapes Constraint Language (SHACL) constraints. Any format that can be parsed by Action Message Format (AMF) or described using AnyPoint Modeling Language (AML) can be validated herein. A simplified syntax based on AMF validation profiles can be exposed to users authoring rulesets. This metadata, including both the validation profile and the resource being validated, can be stored natively within the IT system.

Validation rules may be added to a validation profile with a corresponding severity level. Examples of severity levels may include "info," "warning," and "violation." The assigned severity level determines how an error with the validation is reported. For example, if a single validation rule with a severity level of "violation" fails, the input metadata graph will not conform. Alternatively, if one or more rules fail with severity levels of "info" or "warning," the validation report may include information regarding each failure, but indicate that the input metadata graph is conformant.

A validation profile may store metadata documenting the use case for the rule including information such as category of the rule, level (i.e., section, subsection, paragraph), author, state of the rule (draft, approved, deprecated), positive and negative code examples, and additional associated documentation. This information may be used to generate markdown documentation for the ruleset that can easily be read by a human user to understand the rationale behind the ruleset. It is possible to introduce rules that do not include validation logic and only document general aspects or best-practices.

In some embodiments, validation may be performed by a semantic validator. The sematic validator may accept a validation ruleset and one or more semantic graphs as inputs and generate a validation report indicating any violations of the rules in the ruleset over the input semantic graphs.

The semantic validation process may comprise three stages: semantic graph linking, semantic inference, and semantic constraint check. In the semantic graph linking stage, multiple input semantic graphs may be combined into a single, unified semantic graph by merging nodes with the same global identifier. For example, a first input graph may have been generated from a first metadata object containing general information about an API endpoint. A second input graph may have been generated from a second metadata object containing authentication information about the same endpoint. Because both input graphs describe the same endpoint, they will both have a node with a global identifier identifying the endpoint. This global identifier may be used by the semantic validator to link the nodes containing the global identifier in first and second input graph. After linking both graphs are combined into a single unified semantic graph with a node for the endpoint containing the general information from the first graph and the authentication information from the second graph.

In the semantic inference stage, the unified graph may be enriched by the application of a set of logical rules that add new labels into semantic graph nodes, properties, and links. This allows for the possibility to unify the potential semantic differences carried from the underlying metadata formats or to map related concepts to a common ontology. Multiple logical formalisms can be used to define the rules enriching the semantic graph consumed as a set of logical assertions such as rules, ontologies and query languages.

In the semantic constraint check stage, sematic validation may be performed over the unified and enriched semantic graph. Semantic validation is the process of checking a set of semantic constraints that are contained in a ruleset over the instance of a semantic graph and reporting non-conformant nodes in the graph for each of the semantic constraints being validation. The source of the validation is reported to the original metadata format due to the associated source maps. This process is further described in FIG. 1.

FIG. 1 is a block diagram of a system for semantic metadata validation, in accordance with an embodiment. A metadata object 110 may be fed into a semantic parser 120 as an input and semantic parser 120 may then parse metadata object 110 to produce a semantic graph 130. Semantic graph 130 may be a data model in which information is stored in linked nodes comprising properties. As part of the parsing process, semantic parser 120 may generate a source map 112. Source map 112 may contain information relating each node, link, and property of semantic graph 130 to the specific syntactical location (line, column) in the source metadata object from which the information was parsed. Additionally, source map 112 may be stored in semantic graph 130.

In some embodiments, multiple metadata objects 110, of one or more metadata formats, describing a resource may be fed into semantic parser 120. The metadata objects 110 describing the resource may have been generated by different processes within an IT system hosting the resource. Semantic parser 120, configured to parse metadata object of the one or more metadata formats, may parse these metadata objects and generate a single semantic graph 130 describing the resource. In this case, multiple source maps 112, one for each input metadata object, may be generated during the parsing process.

Validation ruleset 140 may comprise a set of validation rules to be applied to input metadata object 110 during the semantic validation process. In some embodiments, validation ruleset 140 may be stored in a metadata format. A second semantic parser 122 may be configured to accept validation ruleset 140 as an input and parse the ruleset into a set of semantic constraints 150, which semantic parser 122 may provide as an output. Semantic constraints 150 may comprise a set of sematic constraints as defined by validation rules in validation ruleset 140 and map to semantic graph 130. Additionally, semantic parser 122 may also generate source map 114 as part of the semantic parsing process of validation ruleset 140.

Once the parsing process has been completed, the outputs, semantic graph 130 and semantic constraints 150 are then fed into semantic validator 160 as inputs. Semantic validator 160 may accept one or more semantic graphs 130 and semantic constraints 150 parsed from a validation ruleset 140 as inputs and output a validation report 170.

In some embodiments, semantic validator 160 may translating semantic constraints 150 into a first-order logic (FOL) representation of the rules. Alternatively, if a validation library that requires a specific validation rule language is used, semantic validator 160 may translate semantic constraints 150 to the required language. For example, a general-purpose policy engine such as Open Policy Agent (OPA) may be used to perform the validation of semantic graph 130. Accordingly, semantic validator 160 may translate the validation rules to OPA's policy language, Rego.

The product of this translation may be structural checks that can be applied over semantic graph 130. The structural checks may be defined in terms of the semantic labels associated with the nodes, properties, and links of the semantic graph which server as rule targets. In some embodiments, individual structural checks may be combined using Boolean operators to produce more complex validations.

Validation report 170 may comprise violations of the validation rules from validation ruleset 140 when applied to semantic graph 130. However, validation report 170 may not contain contextual information about each violation that would be useful in addressing the violations. As such, validation report 170 may be converted into textual validation report 190, which can be consumed by a human user or processed by a machine, using metadata generator 180. In order to generate textual validation report 190, metadata generator 180 may retrieve, for each violation, a set of information relevant to the violation and provide the information in a human readable format. In some embodiments, the information provided for each violation may include the severity of the violation, the validation error message, the identifier of the rule, the unique global identifier of the node in the semantic graph, and syntax information of the location of the failing node in the source metadata object. In some embodiments, an execution trace containing the evaluation steps followed by the validator to check the failed semantic constraint over the input semantic graph may also be provided for one or more of the violations in textual validation report 190 for debugging purposes.

In some embodiments, textual validation report 190 may be sent to a client device application and displayed to a user via a user interface (UI). The application may be a web, desktop, or mobile application. Additionally, or alternatively, textual validation report 190 may be processed by a backend application to determine whether any of the violations meet a predetermined severity threshold. If a violation of a severity level meeting or exceeding the threshold is found, a notification may be generated and pushed to one or more designated users.

Figure 2:
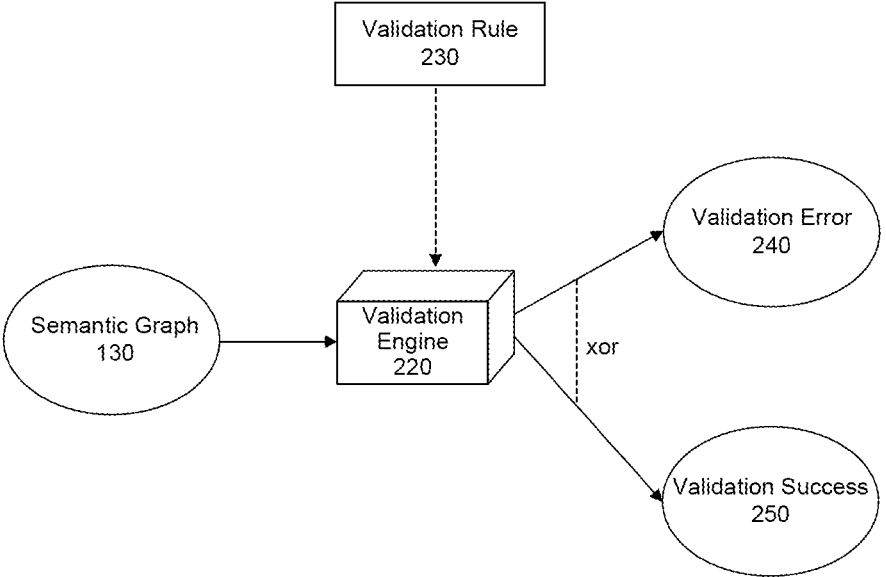
FIG. 2 is a block diagram illustrating a system for semantic metadata validation using basic validation, in accordance with an embodiment.

FIG. 2 is a block diagram illustrating a system for semantic metadata validation using basic validation, in accordance with an embodiment. Validation rules 230 are the basic validation unit and expresses a single constraint that can be enforced over semantic graph 130 in terms of the semantic labels. These semantic labels are labels associated with the nodes, links and properties of semantic graph 130 and encoded in semantic graph 130 as part of the semantic parsing process. Validation rules 230 may further be characterized as a function that uses sematic graph 130 as an input and generates a validation result as an outcome. However, validation rules 230 are written in declarative syntax and thus a validation engine 220 may be required to interpret the declared rules into logical assertions and compute the final validation results (either an error 240 or success 250). It should also be noted that two or more validation rules 230 may be combined to form more complex validation rules and thus increasing the expressivity and power of the validation mechanism.

As noted above, each validation rule 230 may comprise three main components: documentation, rule target, and rule definition. The documentation may be human-readable description documenting the goal of the rule and the validation error message that will be displayed if the rule fails. The rule target may be a selector for a set of target nodes in the input semantic graph 130 which will be checked to determine whether they conform to the validation rule. Target nodes may be defined in validation rules 230 as the labels of the nodes being targeted by each rule. These nodes may be selected in sematic graph 130 by matching the target selector over the node with the node label in sematic graph 130. The rule definition may be a declarative expression declaring the constraint that will be checked over the target nodes.

In some embodiments, there may be two types of validations that can be performed by the mechanism described herein: basic validation and complex validation. Validation rules 230 may be basic validation rules. Basic validation may use basic validation rules 230 to constrain properties of any node in the input semantic graph 130, according to the well-defined set of validation rules 230. The application of basic validation rules 230 may compute first a set of values over which the rule will be checked. In some embodiments, in order to select the values over which the rule will be checked, the designer of a basic validation rule 230 may use the name of a property in the node or a complex property path from the target node. Property paths may include sequential properties, alternative paths, or inverse paths. As noted above, validation engine 220 is responsible for interpreting basic validation rules 230 and applying the validation rules over the selected values.

Examples of basic validation rules 230 may include rules that check the cardinality of properties, rules that check regular expressions over the property values, rules that enumerate the potential values for a property, etc. In some embodiments, basic validation rules 230 may quantify the validation check numerically and introduce the constraint checking that matching values can differ to each other. In some embodiments, basic validation rules 230 may be used to compare values of more than one property in a target node with each other.

Violation of validation rules 230 may result in a validation error 240. Validation engine 220 may perform the checks and determine a violation of one or more of the validation rules 230 has occurred. Accordingly, validation engine 220 may output a validation error 240. Validation error 240 may comprise the identifier of the rule being violated, the value or values causing the validation error 240, and the error message provided in the documentation of the rule. Alternatively, if no violations of validation rules 230 are detected, validation engine 220 may output validation success 250 indicating that semantic graph 130 is conformant (e.g., the resource described by semantic graph 130 is compliant with the constraints checked by validation rules 230).

Complex validation may use complex validation rules to applying more expressive constraints over the input semantic graph 130. Complex validation rules may be generated by combining basic validation rules 230 using logical operators (e.g., and, or, xor, and not). Complex validation rules may be applied to semantic graph 130 by validation engine 220 in a similar manner to basic validation rules 230 as described above.

In some situations, complex validations may not be sufficient to check a particular constraint over an input metadata graph 130. These situations may warrant the use of a third-party validation library such as Open Policy Agent (OPA), which uses Rego, a high-level declarative language, to define validation rules. As such, the validation engine may need to translate rules into the language required by the third-party validation library. As a non-limiting example, Rego will be used to describe this validation process herein. In some embodiments, validation engine 220 may use Action Message Format (AMF) to parse validation rules into compliant Rego code that can then be used by the OPA validation library to apply constraints over semantic graph 130. These Rego validation rules may be characterized as Rego templates designating the next node in semantic graph 130 to be validated. Rego validations may be used as stand-alone validation. Alternatively, Rego validations may be combined with simple and complex validations using regular Boolean combinations.

Figure 3:
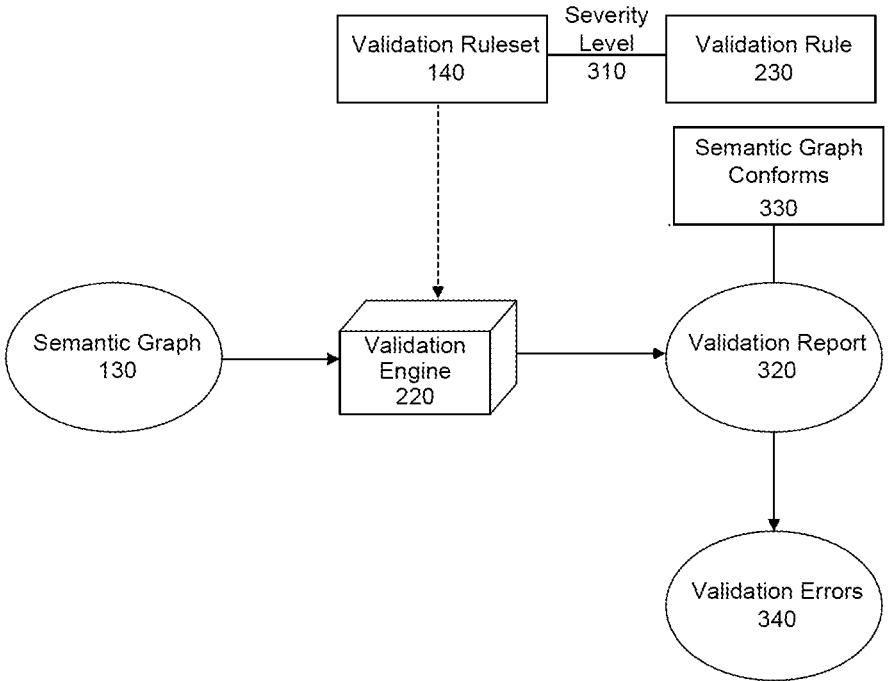
FIG. 3 is a block diagram illustrating an exemplary validation engine system using validation rulesets, in accordance with an embodiment.

FIG. 3 illustrates a functional block diagram of an exemplary validation engine system using validation rulesets, in accordance with an embodiment. As described above, validation rulesets 140 are collections of validation rules 230 that may be applied together during the process of semantic validation. Validation rules 230 may be added to validation ruleset 140 with an assigned severity level 310. The severity level 310 of validation rule 230 dictates how validation error 340 for validation rule 230 is reported. Examples of severity levels may include "info," "warning," and "violation."

In some embodiments, semantic graph 130 and validation ruleset 140 may be input into validation engine 220. Validation engine 220 may interpret validation ruleset 140 into a set of logical assertions that can be applied over semantic graph 130. Validation engine 220 may then apply the validation rules 230 from validation ruleset 140, as logical assertions, over semantic graph 130. The results of applying the rules in validation ruleset 140 to semantic graph 130 may be output by validation engine 220 in the form of validation report 320.

Validation report 320 may include an indication the input semantic graph (130) conforms 330. Alternatively, validation report 320 may indicate that input semantic graph 130 does not conform. Validation report 320 may indicate that semantic graph 130 is not conformant if one or more of the validation rules 230 in validation ruleset 140 having a severity level of "violation" fail. Alternatively, if none of the validation rules 230 having a severity level of "violation" fail, validation report 320 may indicate that semantic graph 130 is conformant. Semantic graph 130 may be conformant even if validation rules 230 having severity levels of "info" or "warning" may have failed. In some embodiments, validation report 320 may include information about validation failures of validation rules 230 having severity levels of "info" or "warning." The information provided may include, the identifier for the failed validation rule, the severity level of the rule, the unique global identifier of the node in the semantic graph, and syntax information of the location of the failing node in the source metadata object.

If sematic graph 130 is not conformant, validation report 320 may include validation errors 340. Validation report 320 may include a validation error 340 for each validation failure of a validation rule 230 having a severity level of "violation." Each validation error 340 may comprise at least: an identifier for the failed validation rule, a severity level of the validation rule 230, a unique global identifier for the failed node in semantic graph 130, and syntax information indicating the location of the failing node in the source metadata object.

In some embodiments, validation reports 320 may be valid semantic graphs (similar to semantic graph 130) that can be linked, stored, and queried together with the source semantic graph 130 being validated. Linking of validation reports 320 may be performed using the same process as that for linking semantic graphs described above.

Furthermore, validation ruleset 140 may be extended and reused. When one validation ruleset extends another validation ruleset, all the validation rules 230 in both rulesets may be included in the set of rules of the extender ruleset. However, the severity level 310 associated with the inherited validation rules may be changed or even deactivated. Validation rulesets, as described, may contain thematically related rules. For example, a validation ruleset may be created that contains only validation rules for API validation.

FIG. 4 is a flowchart illustrating an example method for validating metadata using a semantic schema validation, in accordance with an embodiment. Method 400 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in method 400 may not need to be performed in the exact order shown, as will be understood by a person of ordinary skill in the art. Accordingly, the scope of the invention should not be considered limited to the specific arrangement of steps shown in FIG. 4. Method 400 shall be described with reference to FIGS. 1-3. However, method 400 is not limited to that example embodiment.

In 410, one or more metadata objects 110 describing a resource may be retrieved from a database. The one or more metadata objects may have different metadata formats. The one or more metadata objects may then be input into semantic parser 120.

In 420, semantic parser 120 may parse the one or more metadata objects into one or more semantic graphs 130. Sematic graphs 130 may be data formats in which information is stored as linked nodes holding properties. Every node of sematic graph 130 may have a valid global identifier. Additionally, every node, link and property may have a well-defined meaning through a set of globally valid labels attached to them. The resulting labelled semantic graph 130 may be used as input for a formal reasoning engine transforming it into an equivalent set of logical assertions.

In some embodiments, semantic parser 120 may generate global identifiers for each node in the one or more semantic graphs 130. Additionally, semantic parser 120 may generate one or more source maps 112. Source maps 112 may contain information relating each node, link, and property of sematic graphs 130 to the specific syntactical location (line, column) in the source metadata object from which the information was parsed. Additionally, source map 112 may be stored in semantic graphs 130.

In 430, a validation ruleset 140 corresponding to the resource being validated may be retrieved from the database and input into semantic parser 122. Semantic parser 122 may accept validation ruleset 140 as an input and output semantic constraints 150. Semantic parser 122 may also generate source map 114. Source map 114 may contain information relating each semantic constraint node to the specific syntactical location (line, column) in the source validation ruleset from which the constraints were parsed. Semantic constraints 150 may comprise a set of sematic constraints as defined by validation rules in validation ruleset 140. Additionally, semantic constraints 150 may map to semantic graphs 130 over which the constraints will be applied.

In 440, validation engine 220 may apply the semantic constraints 150 defined by validation ruleset 140 over semantic graphs 130. Validation engine 220 may perform the validation by applying semantic constraints 150 to semantic metadata 130. Validation engine 220 may be a component of semantic validator 160.

In order to facilitate this validation, semantic validator 160 may first link the one or more input semantic graphs 130 in a semantic graph linking process. Semantic validator 160 may combine input semantic graphs 130 into a single, unified semantic graph by merging nodes with the same global identifier. Semantic validator 160 may then enrich the unified semantic graph by applying a set of logical rules that add new labels into semantic graph nodes, properties, and links. Multiple logical formalisms can be used to define the rules enriching the semantic graph consumed as a set of logical assertions: rules, ontologies, query languages. For example, a rule asserting that every node returned by an "api: Operation" node may also be classified as an "api: Message" node may be applied to the unified semantic graph. These types of semantic inferences allow for unifying semantic differences that may still exist due to initial input metadata objects 110 having different metadata formats. This process also allows for mapping related concepts to a common ontology.

In some embodiments, semantic validator 160 may use a validation engine to interpret the validation ruleset into a set of logical assertions that makes it possible to check the constraints over the semantic graph 130. This may be achieved through multiple mechanisms and the format of the resulting structural checks may depend on the validation library used (e.g., OPA). Additionally, the structural checks may be defined in terms of the semantic labels associated with the nodes, properties, and links of the semantic graph which server as rule targets.

Once the validation ruleset has been interpreted into structural checks and sematic graphs 130 have been unified into a single semantic graph and subsequently enriched, validation engine 220 may then apply the structural checks over the unified semantic graph. During this semantic validation, validation engine 220 may report non-conformant nodes in the graph for each of the semantic constraints being validation.

In 450, validation engine 220 may generate a validation report 170 comprising violations of the validation rules. Validation report 170 may have a semantic graph format that can be linked, stored and queried together with the source semantic graph being validated. However, validation report 170 may not be of an ideal format for human consumption. As such, validation report may be converted into textual validation report 190 using metadata generator 180. For each violation/non-conforming node reported, textual validation report 190 may provide the severity of the violation, the validation error message, the identifier of the rule, the unique global identifier of the node in the semantic graph, and syntax information of the location of the failing node in the source metadata object. Textual validation 190 may additionally provide, for each violation, an execution trace containing the evaluation steps followed by the validator to check the failed semantic constraint over the input semantic graph. This may be useful for debugging the violations.

In step 450, textual validation report 190 may be transmitted to a client device and displayed via a user interface (UI) to a user with the appropriate credentials. Additionally, or alternatively, violations reported in textual validation report 190 may cause a notification to be generated and pushed to client devices for one or more designated users. Designated users may be users with admin access and/or users that have been assigned ownership of the resource for which the validation was performed within the IT system.

FIG. 5 is a flowchart illustrating an example method for generating and utilizing a validation ruleset to validate metadata using an exemplary semantic schema validation system, in accordance with an embodiment. Method 500 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in method 500 may not need to be performed in the exact order shown, as will be understood by a person of ordinary skill in the art. Accordingly, the scope of the invention should not be considered limited to the specific arrangement of steps shown in FIG. 5. Method 500 shall be described with reference to FIGS. 1-3. However, method 500 is not limited to that example embodiment.

In 510, a plurality of validation rules 230 corresponding to various aspects of a semantic graph 130 may be retrieved. Semantic graph 130 may comprise information parsed from one or more metadata objects 110. Each rule of the retrieved validation rules 230 may serve to validate a different aspect the semantic graph 130.

In 520, each rule of the plurality of validation rules retrieved may be assigned a severity level 310. Severity level 310 may indicate the severity of a failure of the corresponding validation rule. Each validation rule 230 may be assigned a severity level 310 of "info," "warning," or "violation." The assigned severity level 310 may determine how a validation error of the rule is reported. For example, if an error causes failure of a validation rule assigned a severity level of "warning," the error may be displayed in a validation report 320 along with an execution trace and information indicating a semantic location in a metadata object 110 where the error occurred. However, the validation report 320 may indicate that the semantic graph 130 is conformant despite the failed validation rule. Alternative, if the error causes failure of a validation rule with a severity level of "violation," the validation report 320 may indicate that the semantic graph 130 is not conformant and thus the error must be fixed.

In 530, the plurality of validation rules 230 and their corresponding severity levels 310 may be added to a validation ruleset 140 in order to generate a validation ruleset for validating semantic graph 130. Additional validation rules 230 may be added to validation ruleset 140 at a later time should they be needed for validating sematic graph 130.

Validation ruleset 140 may be extended and reused to validate other semantic graphs provided the graphs comprise information parsed form compatible metadata. This is possible due to thematic consistency among the validation rules in a validation ruleset. For example, semantic graph 130 may comprise information describing a Google API. Accordingly, the validation ruleset 140 generated for validating semantic graph 130 may comprise a plurality of validation rules for validating a Google API. When a validation ruleset extends another, all the validation rules from the extended validation ruleset may be included in the set of validation rules of the extender. However, the severity level associated with the inherited validation rules may be modified and some inherited validation rules may be deactivated.

In 540, semantic graph 130 and validation ruleset 140 may be input into a validation engine 220. Validation engine 220 may be configured to receive one or more compatible semantic graphs (i.e., semantic graphs describing the same resource) and a validation ruleset corresponding to the one or more semantic graphs as inputs and generate a validation report 320 as an output.

In 550, validation engine 220 may interpret the plurality of validation rules 230 in validation ruleset 140, which are stored in a metadata format, and generate a set of logical assertions that can be applied to semantic graph 130. This may be accomplished by using a semantic parser to parse the validation rules 230 into logical assertions that allow for constraints to be checked over semantic graph 130 and conform to a syntax accepted by the validator.

In 560, validation engine 220 may apply validation ruleset 140 to semantic graph 130 by checking. Validation engine 220 may do this by using the logical assertions parsed from validation ruleset 140 to check the constraints enforced by each validation rule over semantic graph 130. The results of this validation process may be an indication that semantic graph 130 is conformant. This may be the case if all the validation rules 230 in validation ruleset 140 passed. Alternatively, the results may indicate that semantic graph 130 is conformant if failure of one or more validation rules occurs but none of the failed validation rules have a severity level of "violation."

However, if failure of one or more validation rules having a severity level of "violation" occurs, the result of validation process may be an indication that semantic graph 130 is not conformant. This result may require intervention in the form of repairing the error within the resource described by semantic graph 130 that caused the failure.

In 570, validation engine 220 may generate validation report 320 based on the results of applying validation ruleset 140 over semantic graph 130. Validation report 320 may include an indication of whether semantic graph 130 is conformant. If one or more validation errors 340 occurred during the validation process, validation report 320 may also include information about the one or more validation errors. For example, if semantic graph 130 is conformant and the validation errors are the result of failure of validation rules 230 having a severity level of "info" or "warning," the information regarding validation errors 340 included in validation report 320 may comprise a rule identifier for the failed validation rule and the severity level of the failed validation rule. Alternatively, if semantic graph 130 is not conformant and failure of one or more validation rules 230 with a severity level of "violation" has occurred, validation report 320 may comprise additional information about the one or more validation errors 340 resulting from failure of the validation rules with a "violation" severity level. This additional information may comprise, an execution trace containing all the evaluation steps followed by the validator to check the constraint over semantic graph 130, the unique global identifier of the failing node in semantic graph 130, and syntax information of the location of the failing node in the source metadata object 110. This information regarding validation rule violations serves to provide adequate debugging information for a user to determine and repair the source of the failure in the resource described by semantic graph 130.

Figure 6:
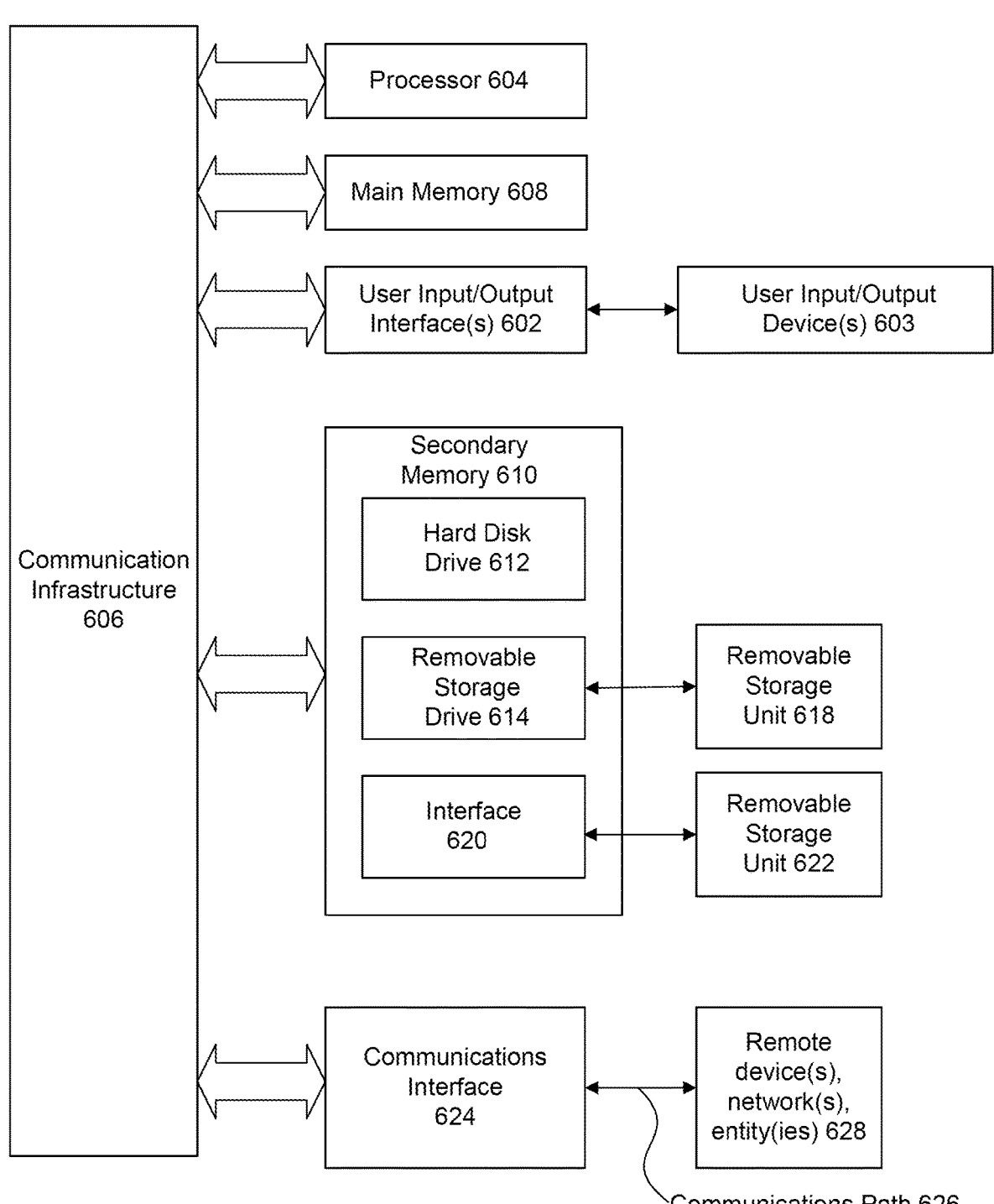
FIG. 6 illustrates an example computer system useful for implementing various embodiments.

Various embodiments can be implemented, for example, using one or more well-known computer systems, such as computer system 600 shown in FIG. 6. One or more computer systems 600 can be used, for example, to implement any of the embodiments discussed herein, as well as combinations and sub-combinations thereof.

Computer system 600 can include one or more processors (also called central processing units, or CPUs), such as a processor 604. Processor 604 can be connected to a communication infrastructure or bus 606.

Computer system 600 can also include customer input/output device(s) 503, such as monitors, keyboards, pointing devices, etc., which can communicate with communication infrastructure 606 through customer input/output interface(s) 602.

One or more of processors 604 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 can also include a main or primary memory 608, such as random-access memory (RAM). Main memory 608 can include one or more levels of cache. Main memory 608 can have stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 can include a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 can read from and/or write to removable storage unit 618.

Secondary memory 610 can include other means, devices, components, instrumentalities or other approaches for allowing computer programs and/or other instructions and/or data to be accessed by computer system 600. Such means, devices, components, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 can enable computer system 600 to communicate and interact with any combination of external devices, external networks, external entities, etc. (individually and collectively referenced by reference number 628). For example, communication interface 624 can allow computer system 600 to communicate with external or remote devices 628 over communications path 626, which can be wired and/or wireless (or a combination thereof), and which can include any combination of LANs, WANs, the Internet, etc. Control logic and/or data can be transmitted to and from computer system 600 via communication path 626.

Computer system 600 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

receiving a metadata object relating to an Application Programming Interface (API) node within a business domain ontology;

parsing the received metadata object, the parsing including:

generating an intermediate semantic graph model relating to the API node based on the received metadata object, the intermediate semantic graph model labeled with a global identifier that identifies the API node and including a plurality of nodes, links, and properties; and generating a source map from the metadata object that contains information relating each node, link and property of the intermediate semantic graph model to a specific syntactical location in the received metadata object;

identifying previously-generated intermediate semantic graph models that include a same global identifier;

combining the generated intermediate sematic graph model with the identified previously-generated intermediate semantic graph models by merging the nodes of the generated intermediate semantic graph model with related nodes of the previously-generated intermediate semantic graph models to generate a unified semantic graph model;

applying a validation profile that includes a validation rule for validating the API node associated with the metadata object over the unified semantic graph model, the validation profile further including metadata documenting a use case for the validation rule, including positive and negative code examples; and generating a validation report indicating a violation status of the validation rule, and markdown documentation for the validation profile based on the applying.

2. The computer-implemented method of claim 1, wherein the validation rule is stored in a metadata format, and wherein the validation rule has a severity level indicating a severity for a violation of the validation rule.

3. The computer-implemented method of claim 2, further comprising:

translating the validation rule into a logical assertion before applying the validation rule to the unified semantic graph model.

4. The computer-implemented method of claim 1, further comprising:

storing the source map as part of the intermediate semantic graph model.

5. The computer-implemented method of claim 4, further comprising:

applying a set of logical assertions to add new labels to nodes, properties, and links of the unified semantic graph model, wherein the new labels are semantic inferences that link related information from different metadata files of a plurality of metadata files.

6. The computer-implemented method of claim 2, wherein the validation report comprises one or more of:

a severity of the violation, a validation error message, an identifier of the violated validation rule, a unique global identifier of a failing node in the unified semantic graph model in which the violation occurred, or information identifying a syntactical location for the failing node in a corresponding metadata file.

7. A system comprising:

a memory; and at least one processor coupled to the memory and configured to:

receive a metadata object relating to an Application Programming Interface (API) node within a business domain ontology;

parse the received metadata object, the parsing including:

generating an intermediate semantic graph model relating to the API node based on the received metadata object, the intermediate semantic graph model labeled with a global identifier that identifies the API node and including a plurality of nodes, links, and properties; and generating a source map from the metadata object that contains information relating each node, link, and property of the intermediate semantic graph model to a specific syntactical location in the received metadata object;

identify previously-generated intermediate semantic graph models that include a same global identifier;

combine the generated intermediate sematic graph model with the identified previously-generated intermediate semantic graph models by merging the nodes of the generated intermediate semantic graph model with related nodes of the previously-generated intermediate semantic graph models to generate a unified semantic graph model;

apply a validation profile that includes a validation rule for validating the API node associated with the metadata object over the unified semantic graph model, the validation profile further including metadata documenting a use case for the validation rule, including positive and negative code examples; and generate a validation report indicating a violation status of the validation rule, and markdown documentation for the validation profile based on the applying.

8. The system of claim 7, wherein the validation rule is stored in a metadata format, and wherein the validation rule has a severity level indicating a severity for a violation of the validation rule.

9. The system of claim 7, wherein the at least one processor is further configured to:

translate the validation rule into a logical assertion before applying the validation rule to the unified semantic graph model.

10. The system of claim 7, wherein the at least one processor is further configured to:

store the generated source map as part of the intermediate semantic graph model.

11. The system of claim 7, wherein the at least one processor is further configured to:

apply a set of logical assertions to add new labels to nodes, properties, and links of the unified semantic graph model, wherein the new labels are semantic inferences that link related information from different metadata files.

12. The system of claim 8, wherein the validation report comprises one or more of:

a severity of the violation, a validation error message, an identifier of the violated validation rule, a unique global identifier of a failing node in the unified semantic graph model in which the violation occurred, or information identifying a syntactical location for the failing node in a corresponding metadata file.

13. A non-transitory computer-readable device having instructions stored thereon that, when executed by at least one computing device, cause the at least one computing device to perform operations comprising:

receiving a metadata object relating to an Application Programming Interface (API) node within a business domain ontology;

parsing the received metadata object, the parsing including:

generating an intermediate semantic graph model relating to the API node based on the received metadata object, the intermediate semantic graph model labeled with a global identifier that identifies the API node; and generating a source map from the metadata object that contains information relating each node, link and property of the intermediate semantic graph model to a specific syntactical location in the received metadata object;

identifying previously-generated intermediate semantic graph models that include a same global identifier;

combining the generated intermediate sematic graph model with the identified previously-generated intermediate semantic graph models by merging the nodes of the generated intermediate semantic graph model with related nodes of the previously-generated intermediate semantic graph models to generate a unified semantic graph model;

applying a validation profile that includes a validation rule for validating the API node associated with the metadata object over the unified semantic graph model, the validation profile further including metadata documenting a use case for the validation rule, including positive and negative code examples; and generating a validation report indicating a violation of the validation rule, and markdown documentation for the validation profile based on the applying.

14. The non-transitory computer-readable device of claim 13, wherein the validation rule is stored in a metadata format, and wherein the validation rule has a severity level indicating a severity for a violation of the validation rule.

15. The non-transitory computer-readable device of claim 13, the operations further comprising:

translating the validation rule into a logical assertion before applying the validation rule to the unified semantic graph model.

16. The non-transitory computer-readable device of claim 13, further comprising:

storing the generated source map as part of the intermediate semantic graph model; and applying a set of logical assertions to add new labels to nodes, properties, and links of the unified semantic graph model, wherein the new labels are semantic inferences that link related information from different metadata files.

17. The non-transitory computer-readable device of claim 14, wherein the validation report comprises one or more of:

a severity of the violation, a validation error message, an identifier of the violated validation rule, a unique global identifier of a failing node in the unified semantic graph model in which the violation occurred, or information identifying a syntactical location for the failing node in a corresponding metadata file.

* * * * *